(12) United States Patent
Hsiao et al.

(10) Patent No.: US 8,057,166 B2
(45) Date of Patent: Nov. 15, 2011

(54) PASSIVE FAN

(75) Inventors: Li-Hui Hsiao, Taoyuan Hsien (TW);
Tsung-Yu Lei, Taoyuan Hsien (TW);
Yen-Chun Huang, Taoyuan Hsien (TW)

(73) Assignee: Delta Electronics, Inc., Taoyuan Hsien (TW)

( * ) Notice: Subject to any disclaimer, the term of this patent is extended or adjusted under 35 U.S.C. 154(b) by 987 days.

(21) Appl. No.: 11/968,837

(22) Filed: Jan. 3, 2008

(65) Prior Publication Data
US 2009/0004003 A1    Jan. 1, 2009

(30) Foreign Application Priority Data
Jun. 29, 2007   (TW) .............................. 96123699 A

(51) Int. Cl.
*F01D 25/24*   (2006.01)

(52) U.S. Cl. .............. 415/122.1; 415/124.2; 416/170 R; 416/189

(58) Field of Classification Search .............. 415/122.1, 415/122.4; 416/170 R, 172, 179, 189, 191, 416/192
See application file for complete search history.

(56) References Cited

U.S. PATENT DOCUMENTS

| | | | | |
|---|---|---|---|---|
| 2,098,407 A | * | 11/1937 | Smith, Jr. .................. | 416/170 R |
| 2,255,908 A | * | 9/1941 | Anderson .................. | 416/170 R |
| 2,450,708 A | * | 10/1948 | Anderson .................. | 416/170 R |
| 3,125,284 A | * | 3/1964 | Lawler ...................... | 416/170 R |
| 3,179,353 A | * | 4/1965 | Peterson ................... | 416/170 R |
| 4,459,087 A | * | 7/1984 | Barge ........................ | 416/189 |
| 4,563,622 A | * | 1/1986 | Deavers et al. ............ | 415/124.1 |
| 4,949,022 A | * | 8/1990 | Lipman ..................... | 417/356 |
| 5,252,875 A | * | 10/1993 | Veronesi et al. ........... | 310/114 |
| 6,194,798 B1 | * | 2/2001 | Lopatinsky ................ | 310/63 |
| 6,744,172 B2 | * | 6/2004 | Duhua ...................... | 310/254.1 |
| 7,456,541 B2 | * | 11/2008 | Horng et al. ............... | 310/268 |

* cited by examiner

*Primary Examiner* — Igor Kershteyn
(74) *Attorney, Agent, or Firm* — Birch, Stewart, Kolasch & Birch, LLP

(57) ABSTRACT

A passive fan includes a frame, at least one impeller and at least one driving device. The impeller is disposed in the frame. The driving device is disposed in the body of the frame and separated from the impeller, and drives the impeller to rotate. The driving device is an independent motor, a driver, a rotating wheel or a driving gear.

23 Claims, 6 Drawing Sheets

PASSIVE FAN

CROSS REFERENCE TO RELATED APPLICATIONS

This Non-provisional application claims priority under 35 U.S.C. §119(a) on Patent Application No(s). 096123699 filed in Taiwan, Republic of China on Jun. 29, 2007, the entire contents of which are hereby incorporated by reference.

BACKGROUND OF THE INVENTION

1. Field of Invention

The invention relates to a fan, and, in particular, to a passive fan.

2. Related Art

As electronic products are rapidly developed to have high performance, high frequency, high speed and thinned size, the temperature of the electronic products is getting higher and higher. Thus, the unstable phenomenon occurs and thus influences the reliability and the lifetime of the product. Accordingly, heat dissipating has become one of the important issues in the electronic product, and a fan is frequently used in a heat dissipating device.

Referring to FIG. 1, a conventional fan 1 includes an impeller 11, a motor 12 and a frame 13. The impeller 11 has a plurality of blades 111. The motor 12 is disposed at a center of the impeller 11, and the motor 12 together with the impeller 11 are disposed in the frame 13. The motor 12 is connected to the impeller 11 and drives the impeller 11 to rotate to generate an air stream for achieving the heat dissipating effect.

In the fan 1, however, the motor 12 is disposed at the center of the impeller 11 and occupies a certain space. So, the areas of the blades of the impeller 11 have to be sacrificed so that the heat dissipating efficiency of the fan 1 is reduced under the integral consideration of the storage space of the motor 12 and the overall size of the fan 1. In addition, the motor 12 itself also generates heat, so the heat dissipating efficiency of the fan 1 is further decreased. Consequently, the design of the fan 1 and the heat dissipating efficiency of the fan 1 are greatly limited.

SUMMARY OF THE INVENTION

In view of the foregoing, one object of the invention is to provide a passive fan capable of reducing a windless region at a center of an impeller and increasing effective inlet and outlet areas of the passive fan without changing the dimension of the fan.

To achieve the above, the invention discloses a passive fan including a frame, at least one passive impeller and at least one driving device. The passive impeller is disposed in the frame, and the driving device is disposed in the body of the frame. The passive impeller is separated from the driving device, and the driving device drives the passive impeller to rotate.

As mentioned above, the passive fan of the invention uses the passive impeller without the motor, and uses the driving device, which is not disposed in the frame, to drive the passive impeller so that the passive fan of the invention can operate. In this case, the passive impeller needs not to rotate spontaneously, so the conventional motor disposed at the center is not necessary. Thus, the central windless region in the related art can be greatly reduced, so that the effective inlet and outlet areas of the passive fan can be greatly enlarged. Accordingly, the heat dissipating efficiency of the fan can be thus enhanced greatly.

BRIEF DESCRIPTION OF THE DRAWINGS

The invention will become more fully understood from the detailed description and accompanying drawings, which are given for illustration only, and thus are not limitative of the present invention, and wherein.

DETAILED DESCRIPTION OF THE INVENTION

The present invention will be apparent from the following detailed description, which proceeds with reference to the accompanying drawings, wherein the same references relate to the same elements.

Figure 1:
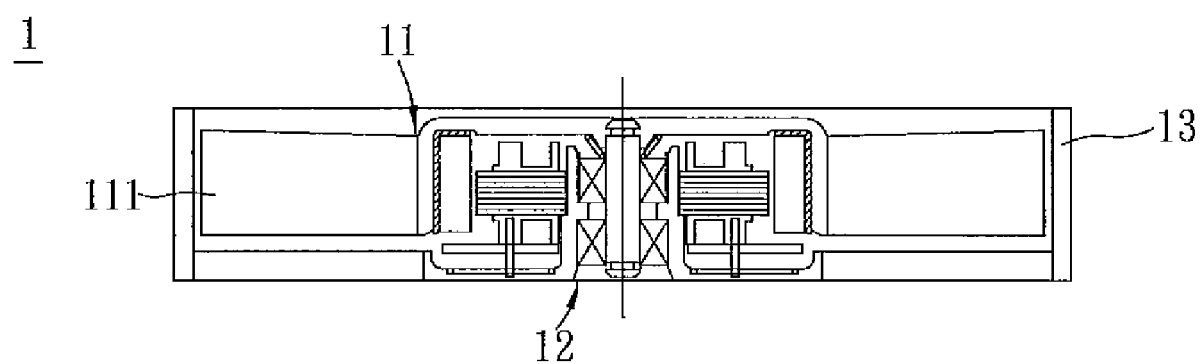
FIG. 1 is a schematic illustration showing a conventional fan.
Figure 2A:
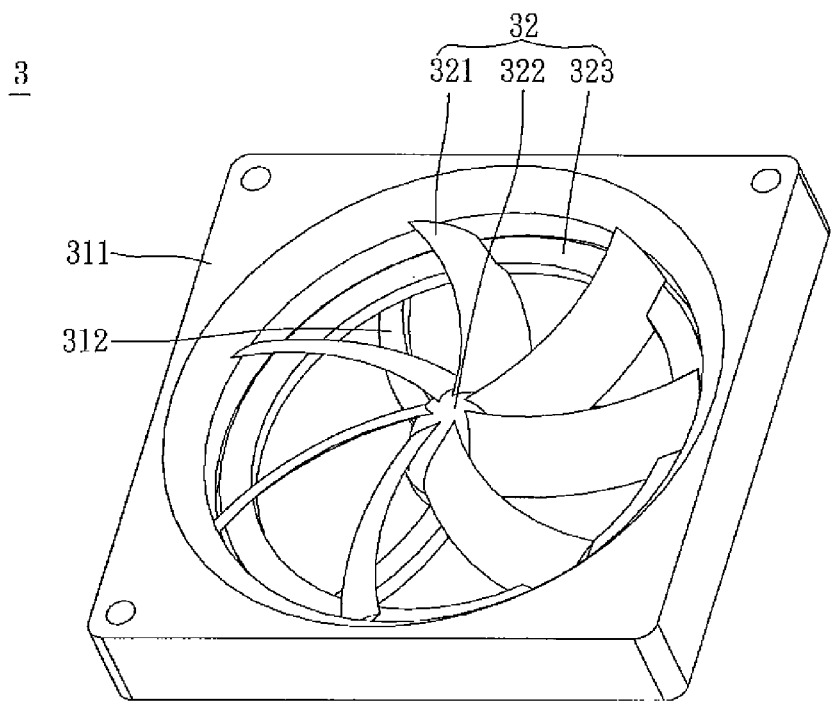
FIG. 2A is a pictorial view showing a passive fan according to a first embodiment of the invention.
Figure 2B:
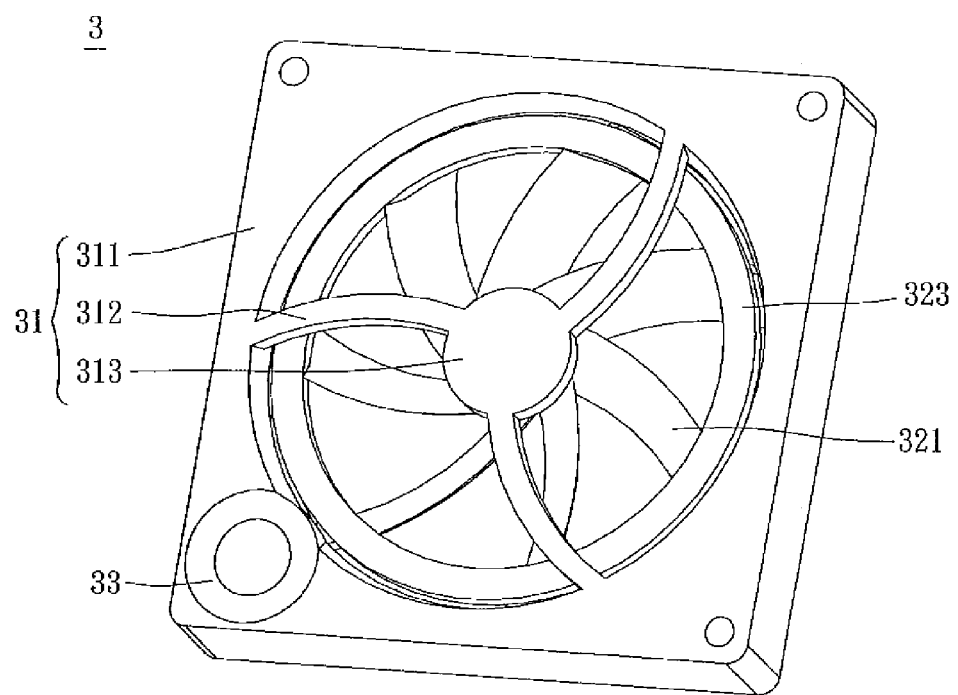
FIG. 2B is a schematic illustration showing an opposite side to FIG. 2A.
Figure 2C:
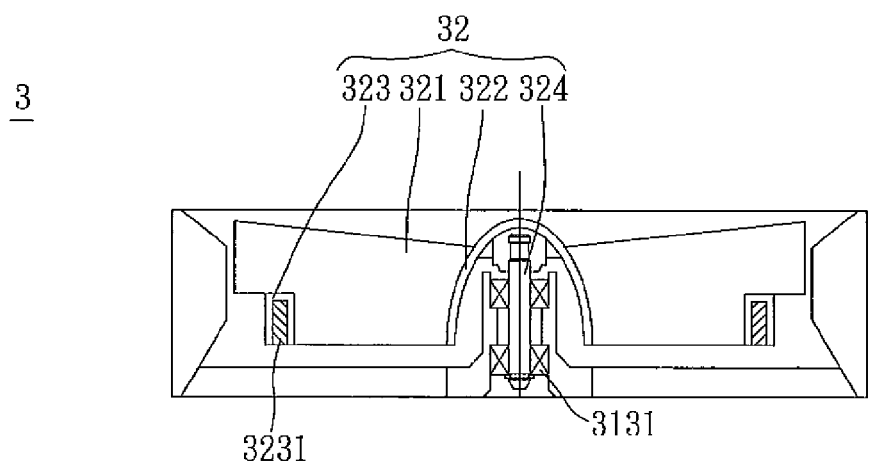
FIG. 2C is a schematic illustration showing a longitudinal cross-section of FIG. 2A.

Referring to FIGS. 2A and 2C, a passive fan 3 according to a first embodiment of the invention includes a frame 31, at least one passive impeller 32 and at least one driving device 33. The passive fan 3 can be an axial-flow fan or a centrifugal fan.

The frame 31 has a frame body 311, at least one rib 312 and a tube portion 313, and the rib 312 is connected to the tube portion 313 and the frame body 311. The number of the ribs 312 is decided according to the actual requirement, and may be one, two or more.

The passive impeller 32 is disposed in the frame body 311, and is telescoped to the tube portion 313. The passive impeller 32 has a plurality of blades 321, a hub 322, a rotating shaft 324 and at least one actuated portion 323. Preferably, no active control device, such as a motor, is disposed in the passive impeller 32. Because the passive impeller 32 has no active control device, the spaces for rotor magnets, stator poles and a control circuit board can be reserved. Thus, the inlet and outlet areas of the passive impeller 32 are greatly increased. Also, no space for the stator poles has to be provided in the frame. Consequently, the maximum inlet and outlet areas can be obtained using the blades with the maximum sizes without changing the dimension of the fan so that the dissipating effect of the fan is greatly increased. The driving device 33 drives the passive impeller 32 by way of magnetic transmission, frictional transmission or engaged transmission.

The blades 321 are mounted around a circumferential edge of the hub 322. The rotating shaft 324 is inserted into the tube portion 313. At least one bearing 3131 is further disposed in the tube portion 313 to support the rotating shaft 324 to rotate.

The actuated portion 323 corresponds to the driving device 33 and is driven by the driving device 33 to drive the passive impeller 32 to rotate. The actuated portion 323 can also be disposed around the circumferential edge of the passive impeller 32, or disposed on the outer edge of the blades 321.

The actuated portion 323 is, for example, a multi-pole annular permanent magnet, a multi-pole annular magnetic structure body covering an annular magnetic body of a multi-pole magnetic body 3231, a structure body with a guiding slot or a structure body with a tooth-like structure. The actuated portion 323 can have an annular shape, an arc shape, a polygonal shape or a curved shape, for example. In addition, the passive impeller 32 can be magnetic blades so that the actuated portion 323 is not needed.

The driving device 33 and the passive impeller 32 are respectively disposed at the outer edge of the frame and inside the frame, and the driving device 33 induces the passive impeller 32 to rotate. The driving device 33 can be an independent motor, a driver, a rotating wheel or a driving gear. The driving device 33 can also be disposed only at a side corner of the frame body 311 or disposed at the outer edge of the frame body 311. The driving device 33 may or may not contact with the passive impeller 32.

Figure 2D:
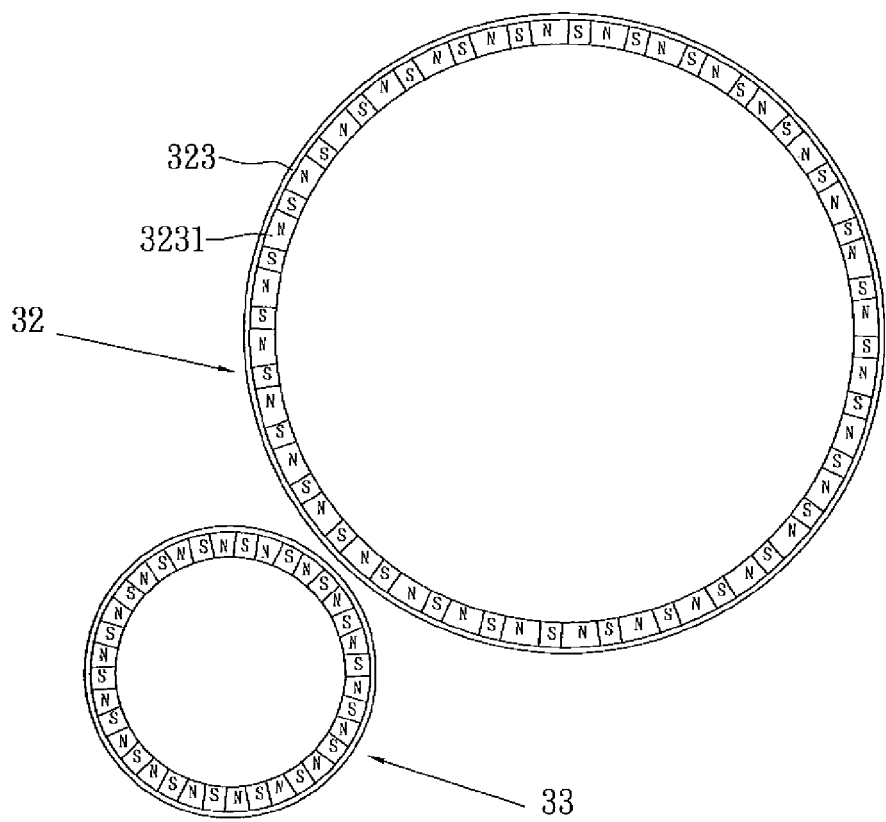
FIG. 2D is a schematic illustration showing magnetic reaction between a driving device and a actuated portion of FIG. 2B.

In the first embodiment, as shown in FIG. 2D, the circumferential edge of the driving device 33 has many circular magnets 331 with N and S poles, and a magnetic reaction force exists between the circular magnets 331 and the actuated portion 323. When the driving device 33 rotates, the actuated portion 323 is driven due to the magnetic reaction force, and thus drives the passive impeller 32 to rotate. The magnetic reaction force can be a magnetic attractive force, a magnetic repulsive force or a magnetic attractive and repulsive reaction force.

Figure 3:
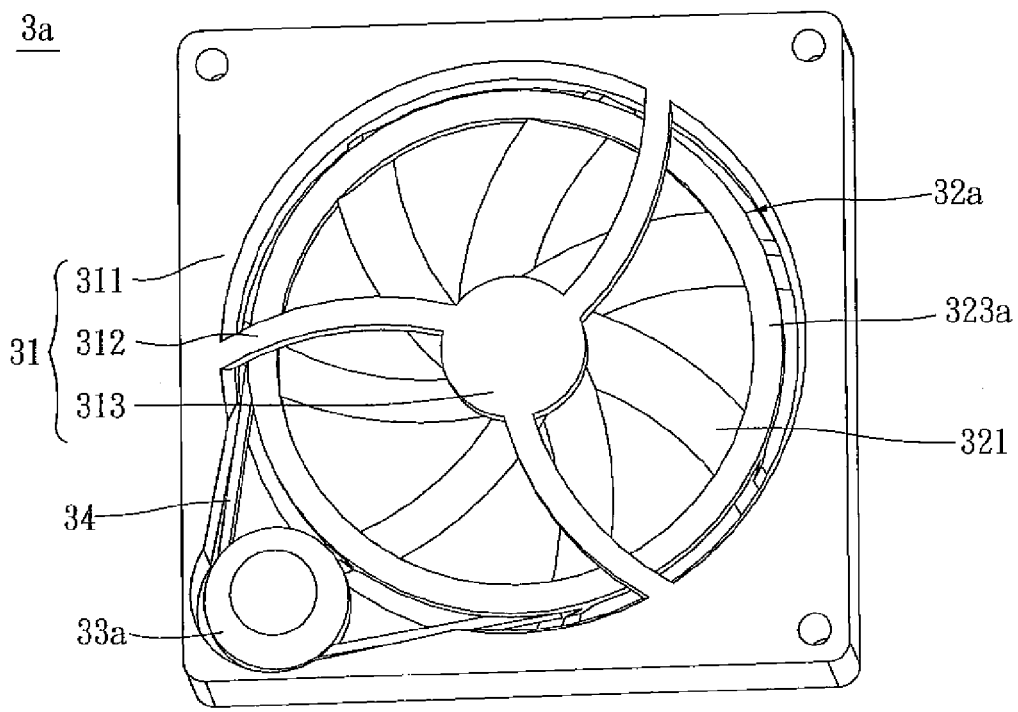
FIG. 3 is a schematic illustration showing a passive fan according to a second embodiment of the invention.

As shown in FIG. 3, a passive fan 3a according to a second embodiment of the invention differs from the passive fan 3 of the first embodiment in that a driving device 33a is a moving body having a guiding slot, and a actuated portion 323a of a passive impeller 32a is changed to a structure body, which corresponds to the driving device 33a and has a guiding slot. The driving device 33a is a driver or a rotating wheel having a guiding slot, for example. In this case, the driving device 33a and the actuated portion 323a rotate together through a transmission structure 34. The transmission structure 34 can be a belt, a chain or any other tape-like body. In addition, the driving device 33a may or may not contact with the actuated portion 323a.

Figure 4:
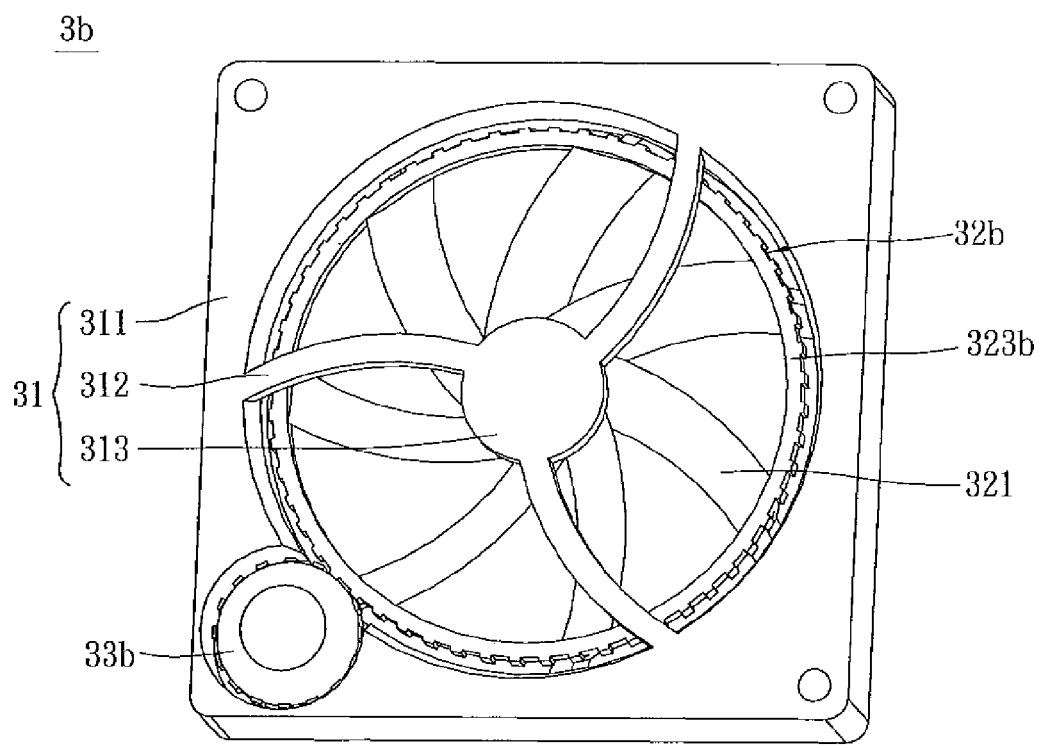
FIG. 4 is a schematic illustration showing a passive fan according to a third embodiment of the invention.

As shown in FIG. 4, a passive fan 3b according to a third embodiment of the invention differs from the passive fan 3 of the first embodiment in that a driving device 33b is a driving gear, and a actuated portion 323b of a passive impeller 32b is changed to a structure body, which corresponds to the driving device 33b and has a straight spur gear, a helical spur gear, a herringbone gear, a pin gear or a tooth-like structure. In this embodiment, the driving device 33b can be engaged with the actuated portion 323b directly or indirectly through another independent gear (transmission structure). In addition, the driving device 33b may or may not contact with the actuated portion 323b.

Although the descriptions of the above embodiments disclose that one driving device drives one passive impeller to rotate, the invention can also use one driving device to drive a plurality of passive impellers to rotate, use a plurality of driving devices to drive one passive impeller to rotate, or use a plurality of driving devices to drive a plurality of passive impellers to rotate.

Figure 5:
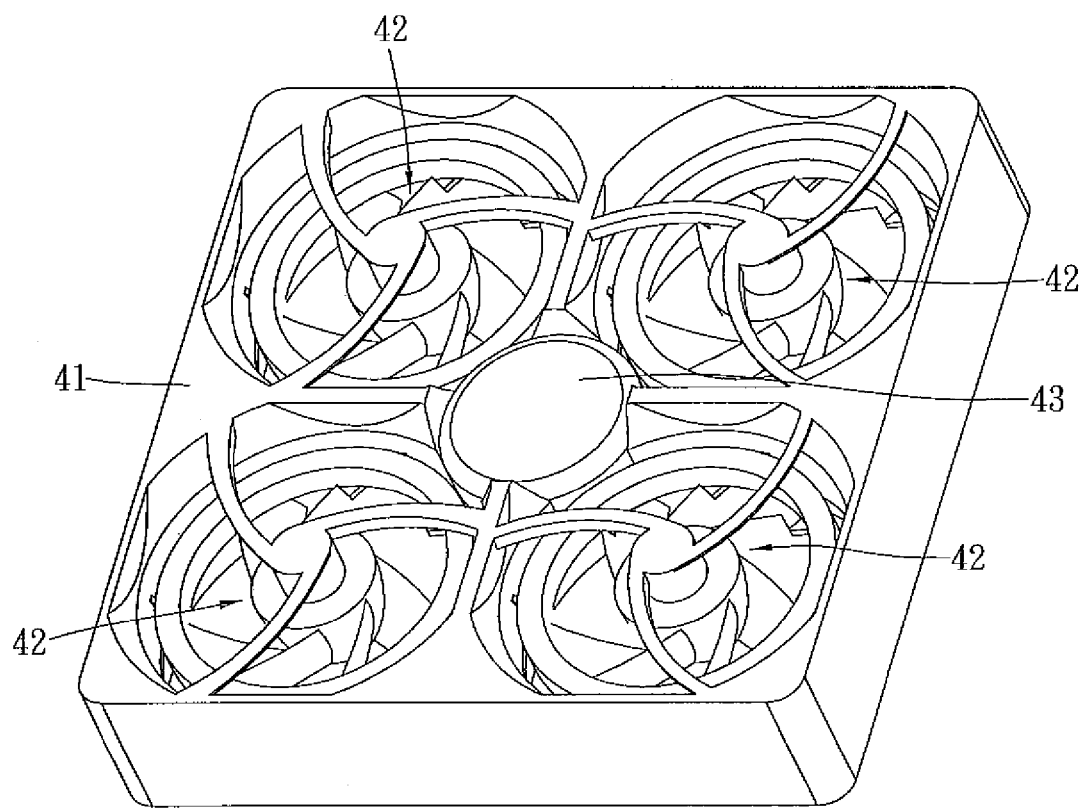
FIG. 5 is a schematic illustration showing a passive fan according to a fourth embodiment of the invention.

Referring to FIG. 5, a passive fan 4 according to a fourth embodiment of the invention includes a frame 41, four passive impellers 42 and one driving device 43, wherein one driving device 43 drives four passive impellers 42. The driving device 43 is disposed at the center of the frame 41 so that the driving device 43 can simultaneously, respectively or sequentially drive the passive impellers 42 to rotate. The driving device 43 can be any one of the driving devices mentioned hereinabove, and the passive impeller 42 has the form corresponding to that of the driving device 43. In this embodiment, the passive fan 4 can obtain the larger gas quantity than that obtained in the conventional fan.

Figure 6:
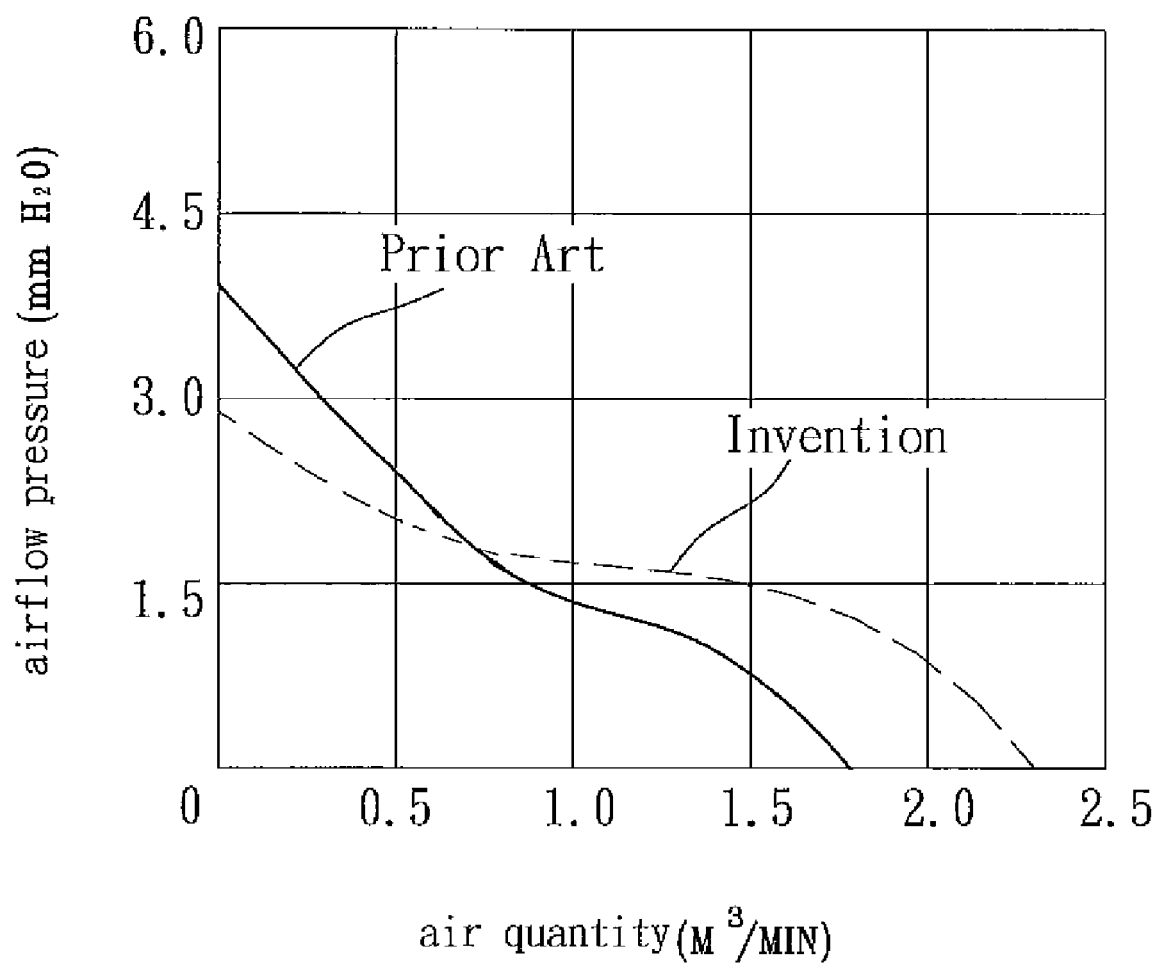
FIG. 6 shows performance curves of the conventional fan and the passive fan of the invention.

FIG. 6 shows performance curves of the conventional fan and the passive fan of the invention. As shown in FIG. 6, the X-axis represents the air quantity with the unit of ($M^3$/min), and the Y-axis represents the airflow pressure with the unit of (mm $H_2O$). When the total dimension and the noise are fixed, the conventional fan is a fan with enlarged blades, while the passive fan of the invention corresponds to the aspect in which one driving device drives two impellers. As shown in FIG. 6, when the dimension and the noise are fixed, the properties of the wind pressure and the gas quantity outputted from the passive fan of the invention are better than those of the prior art. In addition, the passive fan of the invention is free from the drawbacks that the conventional fan tends to run out due to the too-long blades, that the conventional fan tends to deform under heat, and that the conventional fan has the weak stricture intensity and is easily broken.

In addition, the passive impeller is driven by the driving device in the above-mentioned embodiments. However, the invention is not limited thereto. The passive fan can also use an external wind power to blow the passive impeller to move and thus to drive the driving device to generate the electric power.

In summary, the passive fan of the invention uses the passive impeller without the motor, and uses the driving device, which is not disposed in the frame, to drive the passive impeller so that the passive fan of the invention can operate. In this case, the passive impeller needs not to rotate spontaneously, so the conventional motor disposed at the center is not necessary. Thus, the central windless region in the related art can be greatly reduced, so that the effective inlet and outlet areas of the passive fan can be greatly enlarged. Accordingly, the heat dissipating efficiency of the fan can be thus enhanced greatly.

Although the invention has been described with reference to specific embodiments, this description is not meant to be construed in a limiting sense. Various modifications of the disclosed embodiments, as well as alternative embodiments, will be apparent to persons skilled in the art. It is, therefore contemplated that the appended claims will cover all modifications that fall within the true scope of the invention.

What is claimed is:

1. A passive fan comprising:
   a frame;
   at least one passive impeller disposed in the frame; and
   at least one driving device disposed on or in the frame for driving the passive impeller to rotate, wherein when the driving device rotates, the driving device drives the passive impeller to rotate due to the magnetic reaction force, and the passive impeller is separated from the driving device.

2. The passive fan according to claim 1, wherein when there is a plurality of passive impellers, the driving device drives the passive impellers to rotate.

3. The passive fan according to claim 2, wherein the passive impellers are simultaneously, respectively or sequentially driven by the driving device to rotate.

4. The passive fan according to claim 1, wherein when there is a plurality of driving devices, the driving devices commonly drive the passive impeller to rotate, or when there is a plurality of impellers and a plurality of driving devices, the driving devices drive the passive impellers to rotate, respectively.

5. The passive fan according to claim 1, wherein the driving device is an independent motor, a driver, a rotating wheel or a driving gear.

6. The passive fan according to claim 1, wherein the driving device is disposed at one side corner of the frame or outer edge of the frame.

7. The passive fan according to claim 1, wherein the driving device drives the passive impeller through a transmission structure.

8. The passive fan according to claim 7, wherein the transmission structure is a gear, a belt, a chain or a tape-like body.

9. The passive fan according to claim 1, wherein the passive impeller has a plurality of blades and at least one actuated portion, the actuated portion is driven by the driving device to drive the passive impeller to rotate, and the actuated portion is disposed around a circumferential edge of the passive impeller or outer edges of the blades.

10. The passive fan according to claim 9, wherein the actuated portion is an annular magnetic structure body, a structure body having a guiding slot, a structure body having a tooth-like structure, and a multi-pole annular permanent magnet or an annular magnetic body covering a multi-pole magnetic body.

11. The passive fan according to claim 9, wherein the actuated portion has an annular shape, an arc shape, a polygonal shape or a curved shape.

12. The passive fan according to claim 9, wherein when the driving device is a driving gear, the actuated portion is a straight spur gear, a helical spur gear, a herringbone gear, a pin gear or a structure body having a tooth-like structure corresponding to the driving device.

13. The passive fan according to claim 9, wherein a circumferential edge of the driving device has circular magnets with N and S poles, and a magnetic reaction force exists between the circular magnet and the actuated portion.

14. The passive fan according to claim 9, wherein the driving device is a driver or a rotating wheel having a guiding slot, and the actuated portion is a structure body having a guiding slot corresponding to the driving device.

15. The passive fan according to claim 1, wherein the passive impeller is driven by the driving device by way of magnetic transmission, frictional transmission or engaged transmission.

16. The passive fan according to claim 15, wherein the magnetic transmission is a magnetic attractive force, a magnetic repulsive force or a magnetic attractive and repulsive reaction force.

17. The passive fan according to claim 1, wherein when external wind power blows the passive impeller to move, the passive impeller drives the driving device to generate electric power.

18. The passive fan according to claim 1, wherein the frame has a frame body, at least one rib and a tube portion, and the rib is connected to and supports the tube portion and the frame body, and the passive impeller is telescoped onto the tube portion.

19. The passive fan according to claim 1, wherein the passive impeller has no active control device inside.

20. The passive fan according to claim 1, wherein the passive impeller has a plurality of magnetic blades.

21. The passive fan according to claim 1, wherein a circumferential edge of the driving device has circular magnets with N and S poles.

22. A passive fan comprising:
a frame;
at least one passive impeller disposed in the frame; and
at least one driving device disposed on or in the frame for driving the passive impeller to rotate, wherein the passive impeller is separated from the driving device,
wherein the passive impeller has a plurality of blades and at least one actuated portion, the actuated portion is driven by the driving device to drive the passive impeller to rotate, and the actuated portion is disposed around a circumferential edge of the passive impeller or outer edges of the blades, and
wherein when the driving device is a driving gear, the actuated portion is a straight spur gear, a helical spur gear, a herringbone gear, a pin gear or a structure body having a tooth-like structure corresponding to the driving device.

23. A passive fan comprising:
a frame;
at least one passive impeller disposed in the frame; and
at least one driving device disposed on or in the frame for driving the passive impeller to rotate, wherein the passive impeller is separated from the driving device,
wherein the passive impeller has a plurality of blades and at least one actuated portion, the actuated portion is driven by the driving device to drive the passive impeller to rotate, and the actuated portion is disposed around a circumferential edge of the passive impeller or outer edges of the blades, and
wherein the driving device is a driver or a rotating wheel having a guiding slot, and the actuated portion is a structure body having a guiding slot corresponding to the driving device.

* * * * *